Patented Aug. 10, 1926.

1,595,374

UNITED STATES PATENT OFFICE.

PAUL BEEBE, OF AKRON, OHIO, ASSIGNOR TO THE GOODYEAR TIRE & RUBBER COMPANY, OF AKRON, OHIO, A CORPORATION OF OHIO.

METHOD OF MAKING A RUBBERIZED FIBER COMPOSITION.

No Drawing. Application filed July 31, 1922. Serial No. 578,785.

My invention relates to a method of making a rubberized fiber composition, which may be utilized in a variety of capacities, such as for floor or wall coverings, as a substitute for leather, or for any other purpose to which a tough, flexible, porous, water-resistant composition may be adapted.

The object of my invention is to provide a novel method of manufacturing material of the above designated character.

Briefly speaking, my invention consists in suspending a quantity of finely divided rubber particles in a liquid and subsequently adding to the liquid, and thoroughly mixing therewith, a quantity of fibers. The rubber tends to adhere to the fibers and forms a coat thereon. The fibers are then collected from the liquid and formed into a mat and treated in a manner similar to that previously described.

In practicing my invention, I employ fibers which may be of hemp, jute, cotton, wool, leather, asbestos, or any other suitable fibrous material, the material being determined by the service in which the finished material is ultimately intended to be employed. The rubber may be suspended in a semi-colloidal condition in a liquid by mixing a rubber precipitant with a quantity of rubber in solution. This may be done by mixing a toluol rubber solution in a mixture consisting of approximately 77% toluol and 23% alcohol, which is a precipitant at normal room temperature. In the event that the toluol in the rubber solution is of sufficient quantity to render the entire solution a solvent, the rubber may be precipitated by the addition of a suitable quantity of alcohol, or other rubber precipitant, or by reducing the temperature of the solution. I have found it highly desirable to have the rubber constitute approximately 1/2 to 2% by weight of the liquid in which it is suspended, in which proportions I have found that the rubber precipitates into a semi-colloidal or flocculent condition, whereas with a somewhat higher percentage of rubber present, the rubber precipitates in a thick, sticky, solid mass.

After the rubber has been precipitated and is held in suspension in the precipitating liquid, in the form of extremely finely divided particles, a quantity of fibers, preferably approximately equal in weight to the weight of the rubber in the liquid, is added thereto and thoroughly mixed therewith. The tendency of the rubber is to adhere to the fibers and to form a thin uniform coating of rubber thereon. The fibers may then be strained from the solution by permitting the liquid in which they are suspended to pass very slowly through a suitable screen member, thus permitting the fibers to assume their natural or matted relation with respect to each other.

The mat is then washed in a precipitating liquid which serves to displace any solvent left in the rubber with the precipitant, and is then dried and cured in the customary manner by means of heat and pressure.

If desired, the rubber may be depolymerized prior to its passing into solution by a thorough mastication thereof, or it may be depolymerized after passing into the solution by properly heating the solution. Also the mat may be cured by treating it first with sulphur dioxide and subsequently with hydrogen sulphide, or the rubber may be subjected to the curing action of these gases, either while in solution prior to precipitation, or while held in suspension subsequent to precipitation.

It will be apparent from the foregoing that I have provided a novel method of making a rubberized fiber composition, which is both simple and inexpensive.

Although I have described in detail but one form and a single application of my invention, it will be obvious to those skilled in the art that it is not so limited, and that various minor modifications and changes may be made therein without departing from the spirit of my invention or from the scope of the appended claims.

What I claim is:

1. The method of making a fibrous composition which consists in precipitating a quantity of rubber particles out of a solution, mixing a quantity of fibers therewith, so straining the fibers from the liquid as to form a mat, and washing the mat.

2. The method of making a fibrous composition which consists in precipitating a quantity of rubber out of a solution, treating the rubber while in suspension with curing gases, mixing a quantity of fibers with the precipitated rubber, so straining the fibers from the liquid as to effect a mat formation, and drying said mat.

3. The method of making a fibrous composition which consists in precipitating a quantity of rubber out of solution, treating the rubber while in suspension with sulphur dioxide and hydrogen sulphide, mixing a quantity of fibers with the precipitated rubber, so straining the fibers from the liquid as to effect a mat formation, and drying the mat.

In witness whereof, I have hereunto signed my name.

PAUL BEEBE.